Dec. 23, 1930.  E. R. BURTNETT  1,786,287
INTERNAL COMBUSTION ENGINE
Filed July 1, 1929    3 Sheets-Sheet 1

INVENTOR
Everett R. Burtnett

Dec. 23, 1930.                    E. R. BURTNETT                  1,786,287
                           INTERNAL COMBUSTION ENGINE
                        Filed July 1, 1929      3 Sheets-Sheet 2
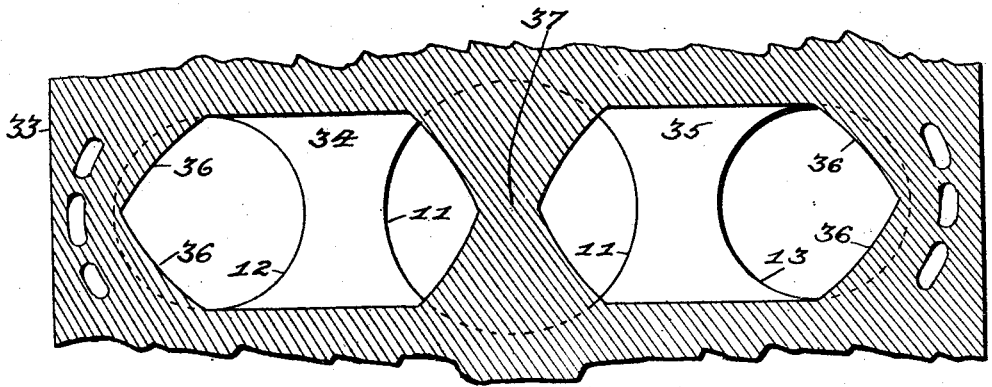
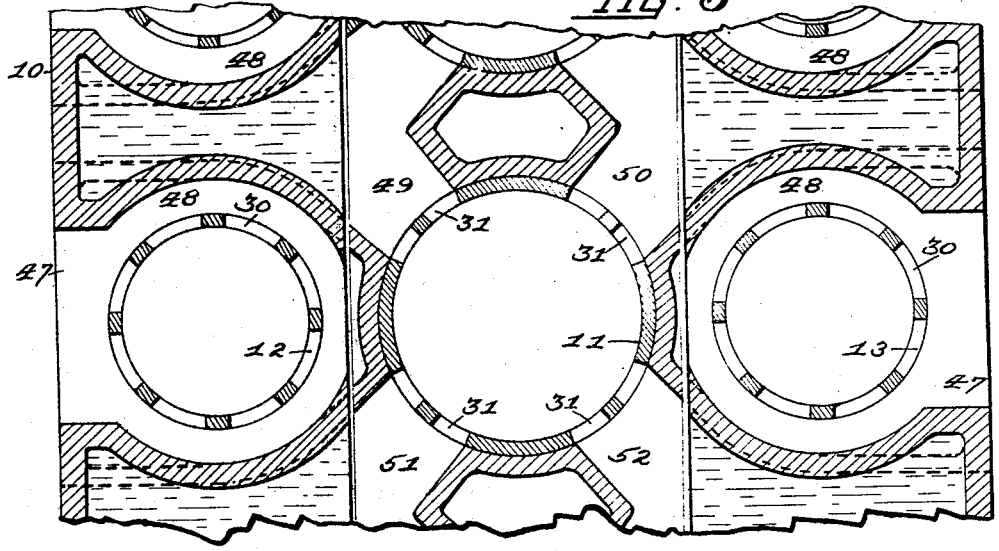
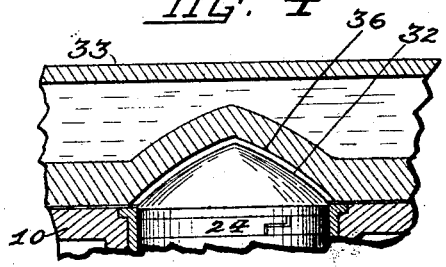
INVENTOR
Everett R. Burtnett Dec. 23, 1930.  E. R. BURTNETT  1,786,287
INTERNAL COMBUSTION ENGINE
Filed July 1, 1929   3 Sheets-Sheet 3
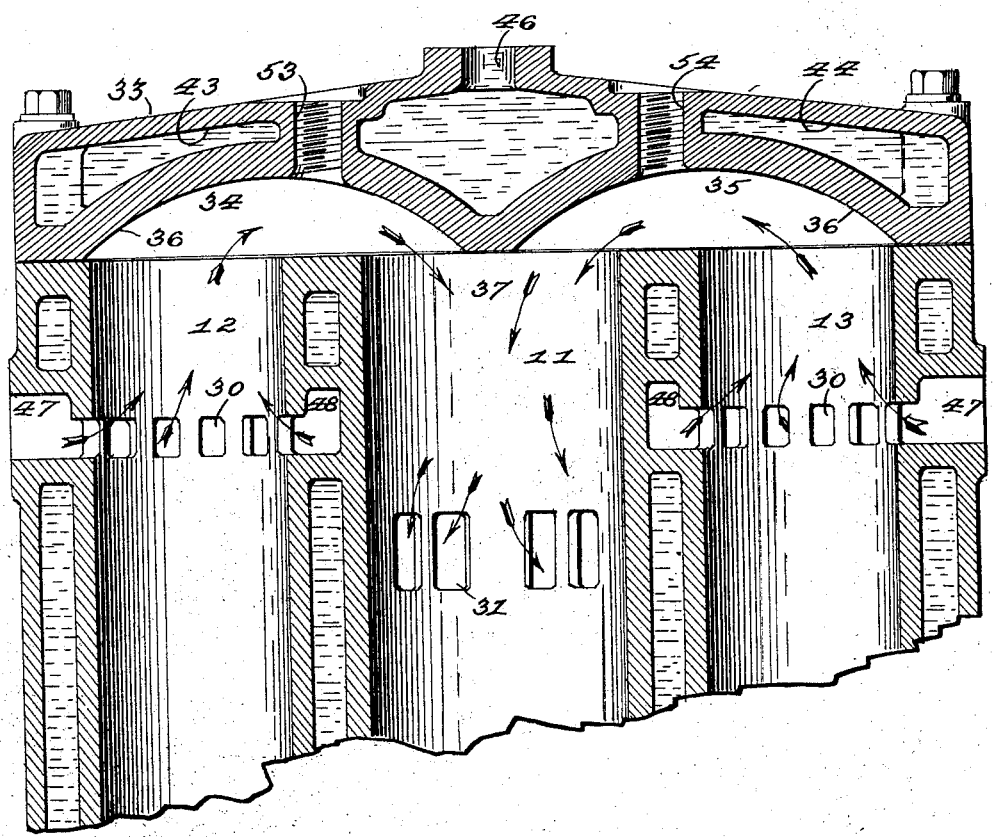
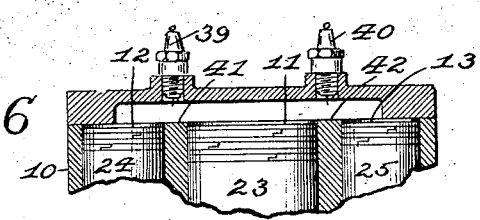
INVENTOR
Everett P. Burtnett Patented Dec. 23, 1930

1,786,287

UNITED STATES PATENT OFFICE

EVERETT R. BURTNETT, OF SANTA ROSA, CALIFORNIA

INTERNAL-COMBUSTION ENGINE

Application filed July 1, 1929. Serial No. 375,069.

My invention relates to internal combustion engines, and more particularly to the two stroke cycle type.

It is well known that in the conventional type of two stroke cycle engine, comprising a single cylinder combustion chamber, having inlet and exhaust ports formed in the wall of the one cylinder, that a considerable amount of the fresh charge escapes from the cylinder chamber through the exhaust ports during the simultaneous open periods of the two ports, and with the single cylinder valveless combustion chamber, adapted to two stroke cycle operation, it has been impossible to localize the relatively small volume of fresh charge in close proximity with the ignition means, during the compression event in the cylinder, which effect is necessary to develop regularity of firing and economical function at light load operation.

Further, it is well understood by those familiar with the art of two stroke cycle engine construction, that owing to the necessity of accomplishing the exhaust and inlet port registration and cut off in a comparatively short period of time, corresponding to the crank rotation and piston movement, that ports formed in the cylinder wall and controlled by the piston therein, provide the most advantageous arrangement for effecting high volumetric efficiency in the operation of a two stroke cycle engine.

Since in a two stroke cycle internal combustion engine, combustion is developed in a respective chamber of twice the frequency with a given crank shaft revolution, it is advantageous to construct the cylinders of small diameter and to provide the pistons with short stroke, to facilitate adequate cooling and minimize the feed piston speed comparatively with the frequency of the heat periods.

In a valveless two stroke cycle construction of small bore and stroke, wherein the valve mechanism actuation speed limitation is removed, and the inertia forces speed limitation is raised, as a consequence of the use of small light weight pistons, the other primary requisite to develop high rotative speed of the crank shaft is means of providing comparatively high volumetric efficiency of filling the combustion chamber with a fresh charge in the correspondingly shorter period of inlet port opening duration. This can only be accomplished, without sacrificing the ratio of effectiveness of the power or expansion stroke with relatively higher port sizes, by providing additional circumferential inlet port area to each respective combustion unit.

In the conventional commonly connected dual cylinder combustion chamber two-cycle engine, the usual practice is to form inlet ports throughout the entire circumference of one of the two cylinders of a given chamber, and to adapt the ports of the other of the two cylinders to the exhaust function. The maximum possible port area, comparatively with the combined piston stroke displacement, obtainable with this conventional construction, has been found relatively insufficient to provide the necessary volumetric efficiency required to approach the practical revolution speed of small multiunit balanced two stroke cycle engines.

The chief object of my present invention is to provide a two stroke cycle engine of relatively greater inlet port area, comparatively with existing types of two stroke cycle engines. In my present invention this object is accomplished by providing three cylinders to one common compression and combustion clearance chamber, with three pistons respectively operating separately in each of the three cylinders, three crank shafts to which the three pistons of each common chamber are respectively separately connected, to provide a series of ports intermediate the ends of each of the three cylinders, and to adapt the ports of two of the three cylinders, preferably the two outside cylinders, to the admission function to the common chamber of the three cylinders.

Further objects of my invention are to provide a triple cylinder combustion chamber having a detachable cylinder head, wherein dual clearance chambers are formed in a manner enabling the respective chambers being readily machined over all, with close accuracy of a radius closely coinciding with the radius of dome shaped piston heads, respectively arranged terminating within the respective clearance chambers, and facilitating the triple cylinders being constructed terminating at their headward ends in a common plane, to provide an improved construction, and improved scavenging, combustion and expansion distribution.

If the unburned portion of the compressed charge can be kept relatively cool until flame propagation of normal combustion, mechanically effected initially at the center of the charge, can reach it, and involve it in normal combustion, a very effective prevention of detonation has been accomplished, for it is common understanding that the temperature of the last gas to burn is the fundamental factor governing detonation. Hence my improved construction.

Further objects of my present invention are to provide a two stroke cycle internal combustion engine, having a three cylinder combustion chamber, with the compression and combustion chamber clearance space to the three cylinders provided in the form of two clearance chambers, relatively formed each respectively communicating one of the two side cylinders with the central cylinder, to form the respective compression clearance chambers so as the portion of the chambers having the least surface to volume ratio is approximately headward of the externally cooled area between a given pair of the three cylinders, and to locate an ignition device in the head of the chamber coincident with the portion of the volume having the least surface to volume area, whereof the path of flame propagation, directly off the ignition device, will not be in line with the head of either of the two pistons associated with a given one of the two compression clearance chambers. This feature of my improved construction is to prevent a hot spot being developed on the head of either piston to a given compression clearance chamber from the heat of successive high frequency flashes of combustion occurring directly before the ignition device.

To withstand high speed operation with high compression the compression and combustion clearance chambers of a two stroke cycle internal combustion engine, must be made as much of a cooling device as is possible. Therefore it is a principal object of my present invention to provide dual inlet cylinders to a common exhaust cylinder and to provide dual clearance chambers to the three cylinder unit which are of a form promoting the greatest possible intensity of cooling of the very last gas to burn in every direction from the point of ignition.

My present improved construction comprising a combination of three cylinders, three pistons, one piston having a flat head, the other two pistons having dome shaped heads, ports formed in all the cylinders, the ports of two of the cylinders being adapted to admission of the cool fresh gases with the combination of two compression and combustion clearance chambers relatively constructed with walls extending coincident with the surfaces of the dome and flat head pistons, provides a construction wherein the inner sides of each of the two small compression chambers are cooled successively following each combustion event, by the fresh charge being inducted to the combined chambers through two cylinders respectively arranged with each of the two clearance chambers, effecting complete scavenging of each of the compression chambers and subsequent cooling, as the fresh charge passes through the relatively small clearance chambers to scavenge and displace the residual gases contained in the central cylinder of the three cylinders which embodies the exhaust ports and the particular and novel form of the compression chambers effected by combination of specifically constructed and relatively arranged parts as more completely described in the following specification provide the form of combustion chamber coincident with the ideal for the operation of two stroke cycle with high compression at high speed.

With the foregoing and other objects in view, my invention consists in certain novel features of construction and arrangement of parts that will be hereinafter more fully described and claimed and illustrated in the accompanying drawings in which:

Fig. 2 is a horizontal section taken approximately on the line 2—2 of Fig. 1.

Fig. 3 is a horizontal section taken approximately on the line 3—3 of Fig. 1.

Fig. 4 is a vertical longitudinal section taken approximately on the line 4—4 of Fig. 1.

Figure 1:
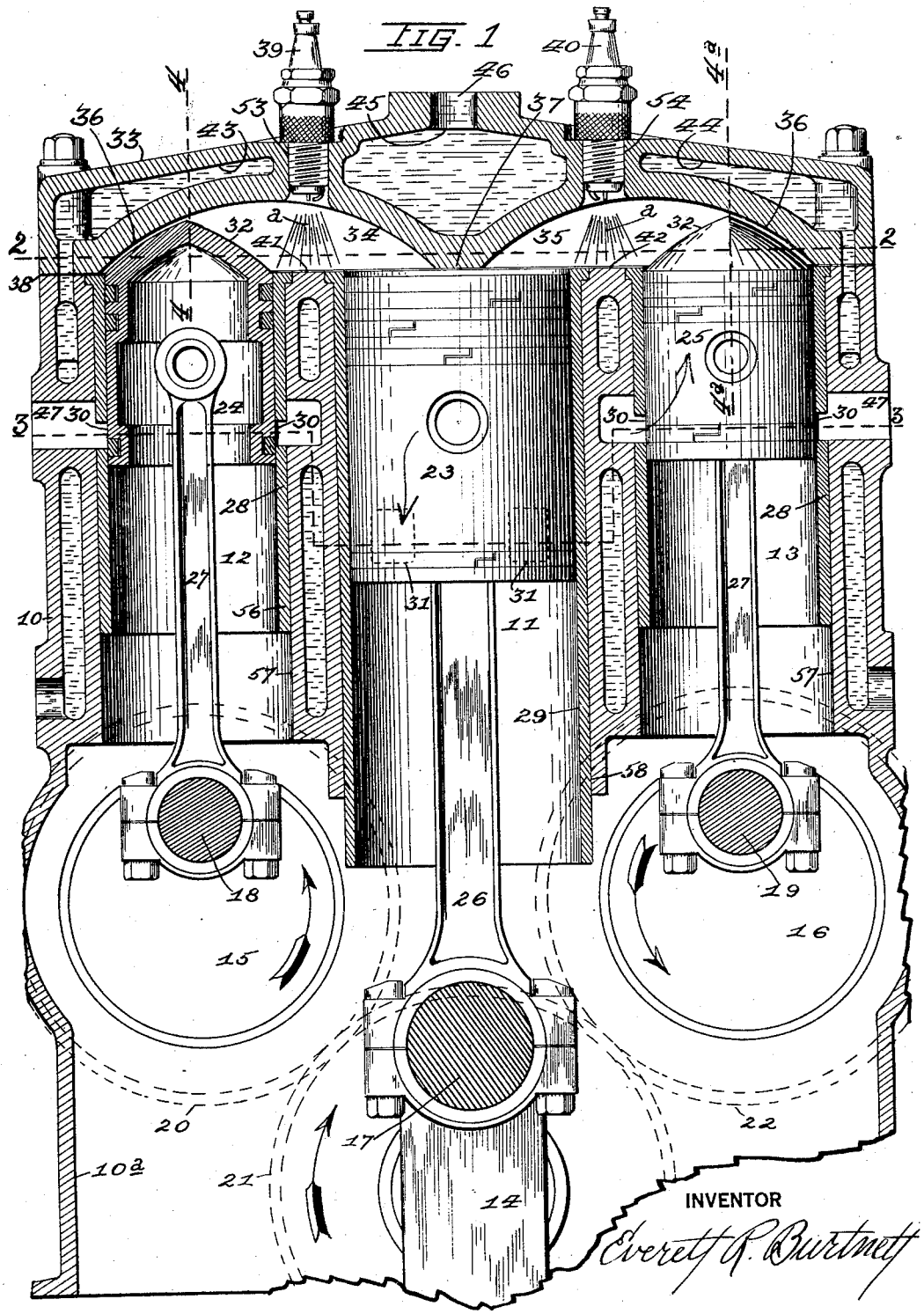
Fig. 1 is a vertical section of an engine of my improved construction.

Fig. 5 is a vertical transverse section taken through the center of the three cylinder combustion chamber of my improved engine, with the pistons removed. The direction of flow of the fresh charge entering the dual inlet cylinders is indicated by the arrows. The arrows entering the ports of the center cylinder represent the exhaust gases escaping through the exhaust ports.

Fig. 6 is a vertical transverse section of a modified form of common compression clearance chamber illustrating a method of connecting the chambers of the three cylinders of my improved construction with a single clearance chamber.

My improved engine includes a combustion unit comprising three power cylinders arranged in a row with their axes all occupying the same plane, with three power pistons respectively operatively arranged within the three cylinders and separately associated with three crank shafts, which are preferably arranged in relation to each other, as shown in Fig. 1.

In the drawings, 10 designates an engine block, preferably constructed of aluminum. Within the block 10 there are formed three power cylinders 11, 12 and 13, preferably disposed with their axes axially parallel. The engine block 10 is preferably constructed with an extending case 10ª, within which three crank shafts 14, 15 and 16 are rotatably arranged preferably with axes parallel. The three cylinders 11, 12 and 13 are arranged in a row relatively transversely with the axial plane of the three crank shafts and each of the three cylinders are respectively arranged with their axis substantially intersecting one of the three crank shafts.

A crank pin is formed of each of the three crank shafts. Crank pin 17 of the shaft 14, crank pin 18 of shaft 15 and crank pin 19 of the shaft 16. Means 20, 21 and 22, respectively of the three crank shafts, are provided rotatably communicating the three crank shafts 14, 15 and 16 operatively so as to cause the three crank pins 17, 18 and 19 of the three shafts to rotate synchronously headward and crankward through the axial plane of the cylinders, of the same rotary speed Three pistons are provided with each combustion unit of my improved construction, one piston being arranged reciprocal within each of the three cylinders. A piston 23 is arranged within the central cylinder 11, a piston 24 is arranged within the side cylinder 12 and a piston 25 is arranged within the other of the two side cylinders 13. The piston 23 of the center cylinder 11 being connected to the crank pin 17 of the center crank shaft 14 by a rod 26, the piston 24 of the side cylinder 12 being connected to the crank pin 18 of the side crank shaft 15 by a rod 27 and the piston 25, of the other of the two side cylinders, being connected to the crank pin 19 of the other of the two side crank shafts 16 by a rod 27.

With the block 10 preferably constructed of aluminum, the cylinders are preferably constructed as shown in Fig. 1, the center cylinder 58 and the two side cylinders 57 being bored in the block and fitted with cylinder liners 28 and 29. This construction provides a hard surface for the pistons to engage in operation and permits the construction of inlet and exhaust communicating passages in the block, of annular form around the respective cylinders without port bridges being formed of the block casting, the ports being milled with accuracy in the removable cylinder liners before being inserted into the block.

Inlet ports 30 are formed intermediate the ends of each of the two side cylinders 12 and 13 of the three cylinder combustion unit of my improved engine and exhaust ports 31 are formed intermediate the ends of the center cylinder 11 of the given three cylinder unit. An annular fresh charge supply passage 48 is formed in the block coincident with the inlet ports of each of the two side cylinders 12 and 13 of a given unit. An opening 47 is provided through the outer wall of the block with each annular passage 48.

The two side pistons 24 and 25, of a given unit, are constructed with domed heads 32, while the piston 23 of the center cylinder 11, of a given unit, is constructed with a flat head.

A detachable cylinder head member 33 is provided and constructed with a machined lower face 37 to engage the cylinder block in a face plane designated by the numeral 38. Two compression and combustion clearance chambers 34 and 35 are formed in the under side of the detachable head member 33. The two clearance chambers 34 and 35 are preferably formed in a line in a transverse plane coincident with the transverse plane of the row of three cylinders of a given three cylinder combustion unit, and are relatively located in the cylinder head 33 with the three cylinders of the block 10, so as the two clearance chambers each respectively provide a passage communication between the chamber of one of the two side cylinders and the chamber of the center cylinder.

The two compression clearance chambers 34 and 35 are formed with their head walls 36 of substantially the same radius as the radius of the dome heads 32 of the pistons 24 and 25 of the two side cylinders 12 and 13 of the three cylinder combustion chamber of my improved construction. The head member 33 is relatively fitted with the cylinder block 10, as to cause the face 37 to be of a face plane 38 parallel and of very close proximity with the plane of the flat head of the piston 23 of the central cylinder 11, when the respective piston is in a position of head end center, as shown in Fig. 1.

Two spark plugs, or other ignition devices, respectively indicated by the numerals 39 and 40 are provided with each three cylinder combustion chamber unit. Preferably the spark plugs are fitted in orifices 53 and 54 in the cylinder head member 33 at points directly opposite the areas of the cylinder block 10 at points 41 and 42 respectively situated between the respective side and central cylinders. With the construction of the two compression clearance chambers 34 and 35, as illustrated in the drawings, this location of the spark plugs as described provides that ignition of the compressed charge will take place at a point in the compressed volume, in each of the two clearance chambers, where there is the least wall surface to volume ratio and where the wave of flame propagation proceeding through the compressed charge from the respective ignition device, will directly strike the externally cooled areas 41 and 42 between the cylinders, instead of the head areas of the pistons.

If the engine is constructed to employ fluid cooling, I preferably form the under sides 43 and 44 of the cylinder member 33 to incline slightly headward to a point 45 coincident with the cooling fluid outlet 46, preferably located at the center of the head member, which construction assures active thermo circulation over each of the two compression and combustion clearance chambers to the fluid outlet.

Outlet communication passages are preferably formed with the exhaust ports 31 of the center cylinder 11 of a given three cylinder combustion chamber, as shown in Fig. 3, there being four exhaust passages 49, 50, 51 and 52 provided respectively coincident with each of four groups of exhaust ports with a substantial cylinder wall area allowed between the respective adjacent groups of exhaust ports, to facilitate heat convection from the areas in close proximity of the exhaust ports and to provide a considerable area, with respect to the stroke plane of reciprocal movement of the piston, to effect the conveyance of an efficient amount of lubricant beyond the exhaust ports.

It will be understood that my present invention has to do only with a three cylinder, three power piston combustion unit, designed to operate of the two stroke cycle principle, to which any supercharger means or compressor device may be adopted, to provide the induction of fresh charge and effect the scavenging of the triple cylinder chamber.

The three power pistons 23, 24 and 25 of the three cylinders making up a common combustion chamber of my improved construction are operated of synchronous stroke movement. The ports of the three commonly joined cylinders are opened substantially simultaneous, with a slight lead of opening effected of the exhaust ports. As shown in Fig. 5 and indicated by the arrows, the fresh cool gases entering the two side cylinders simultaneously while the spent gases are escaping through the exhaust ports of the center cylinder effects a complete scavenging of the dual compression clearance chambers with cool fresh gases, the forced circulation of which, through the relatively small dual compression clearance chambers, provides a highly effective cooling of the internal walls of the compression and combustion clearance chambers, as well as providing a most effective construction for accomplishing the disposition of a portion of the fresh fuel charge in close proximity with the spark plug electrodes, assuring successful regularity of firing and eliminating the so-called high speed miss such as develops in conventional engines.

Compression is simultaneously accomplished in the dual compression clearance chambers by the synchronous actuation of the three pistons within the three cylinders thereto, and the power resulting from simultaneous combustion of the compressed gases in the dual compression clearance chambers, to the three cylinders is transmitted simultaneously, by the three pistons and rods, respectively to the three crank shafts, whence it is transmitted through the driving connections between the three crank shafts to the one of the three crank shafts most adaptable for connection with a power take off, preferably the center one of the three shafts.

It is apparent that my present invention embodying my improved triple cylinder combustion unit construction is not limited in its application to a single unit engine construction, but may be built up in any desired multiple making up a balanced power plant, of either radial, V, X or in line type of multiunit construction.

Power plants made up of various pluralities of units, for almost any purpose, either air or water cooled, either of large or small dimensions of units, constructed in accordance with my present invention, will operate with greatly improved performance, flexibility, economy of fuel consumption, with comparatively less mechanical loss for a given horse power output, capable of sustained heavy duty performance, of low cost of manufacture and maintenance, providing a two stroke cycle internal combustion engine of very great advantages over the conventional four or two-cycle principle engine irrespective of type of general construction.

Obviously, the construction of the engine unit as herein shown and described, may be changed and modified in certain details without departing from the spirit of my invention, the scope of which is set forth in the appended claims.

I claim as my invention:

1. In an internal combustion engine, a three cylinder combustion unit, comprising in combination, one cylinder having exhaust ports and two cylinders having inlet ports, the three cylinders being arranged with their head ends terminating in a common plane, a detachable head arranged with the three cylinders, pistons adapted to control the ports of the respective cylinders being arranged for reciprocatory movement in all the cylinders, the cylinder having exhaust ports being arranged adjacent and between the two cylinders having the inlet ports, the pistons of the two cylinders having the inlet ports being formed with dome shaped heads, the piston of the cylinder having the exhaust ports being formed with a flat head, the three cylinders being formed with a common integral head face, all the pistons being adapted to reciprocate with their headward stroke movement relatively terminating with the peripheries of all the pistons approximately occupying a common plane substantially coincident with the said integral head face of the three cylinders, the said detachable head being formed with its underside face adapted to engage the said integral head face of the three cylinders, two compression clearance chambers formed in the underside face of the said head member, the said two clearance chambers being relatively arranged so as they respectively connect the chambers of the two cylinders having inlet ports with the chamber of the cylinder having exhaust ports, each of the said two clearance chambers connecting the chamber of one inlet port cylinder with the chamber of the cylinder having exhaust ports and each of the said two clearance chambers being formed with their inner walls formed of a radius conforming with the radius of the dome head of the piston of the respective cylinder having the inlet ports to which the respective clearance chamber is adapted.

2. In a two stroke cycle internal combustion engine, three cylinders arranged in a row, the three cylinders being arranged adjacent with their axes parallel, the center cylinder of the row of three cylinders being provided with exhaust ports, the two outside cylinders of the row of three cylinders being provided with inlet ports, pistons operatively arranged within all the cylinders and adapted to control the ports of the respective cylinders, all the cylinders being relatively arranged with their head ends terminating in a common plane and a gasket face formed thereof, a detachable cylinder head adapted to be secured to the said gasket face of the three cylinders, the pistons being arranged reciprocal within all the cylinders whereof they terminate their headward stroke sweep in a common plane substantially coincident with the plane whereof the cylinder head engages the gasket face of the three cylinders, the piston of the center cylinder having the exhaust ports being formed with a flat head, the said piston being relatively arranged reciprocal whereof its head surface occupies a plane substantially coincident with the plane of engagement between the cylinders and the cylinder head member when the said piston is in a position of head end center, the pistons of the two outside cylinders being formed with dome shaped heads, the said two dome head pistons being relatively arranged reciprocal whereof their dome portions extend headwardly beyond the plane of engagement between the cylinders and the cylinder head member when they are in the position of head end center, two compression clearance chambers formed in the under side of the cylinder head member, one of the two compression clearance chambers being arranged with each outside cylinder and the center cylinder, each of the two compression clearance chambers respectively connecting the chamber of one outside cylinder with the chamber of the center cylinder, each of the two clearance chambers being formed respectively terminating in the face of the cylinder head member at a point coincident with the center of the center cylinder and in a plane of relatively close proximity with the plane of the piston head therein when the respective piston is in a position of head end center and the other ends of the two clearance chambers respectively formed terminating at a point coincident with the outermost side of the respective associate side cylinder bore.

3. In an internal combustion engine, three combustion cylinders, the said three cylinders being arranged adjacent, in line, and with axes parallel, the said three cylinders being relatively formed with their head ends terminating in a common plane with an integral gasket face construction, the center cylinder of the said three cylinders being provided with exhaust ports, the two end cylinders of the said three cylinders being provided with inlet ports, three pistons, one piston arranged for reciprocatory movement in each of the said three cylinders, the piston of the center cylinder being formed with a flat head, the two pistons of the two end cylinders having the inlet ports being formed with dome shaped heads, all of the pistons being arranged reciprocal within the respective cylinders whereof they terminate their headward stroke movement with the head ends of their cylindrical peripheries substantially coincident with the plane of the said integral gasket face of the three cylinders, and with the dome construction of each of the two pistons of the two side cylinders protruding beyond the plane of the said gasket face when the respective pistons are in the position of head end center, a cylinder head member arranged detachable with the said three cylinders, a gasket face formed of the said head member adapted to fit the gasket face of the said three cylinders, two compression clearance chambers formed in the gasket face of the said head member, each of the said clearance chambers being formed with an internal wall face of a radius extending from a point coincident with the plane of the gasket face of the head member substantially central with the central cylinder to the furthermost circumferential point of the respective end cylinder and the radius of the said internal wall face of the two compression clearance chambers being substantially concurrent with the radius of the dome head of the respective piston of the end cylinder associated therewith for effecting the displacement of the outer ends of the two compression clearance chambers by the dome heads of the respective pistons thereto at such time as the respective pistons are in a position of head end center.

4. In an internal combustion engine, a triple cylinder combustion chamber, the three cylinders forming the triple cylinder combustion chamber being arranged in a line, two compression clearance chambers, the two compression clearance chambers being arranged at the head ends of the three cylinders, all the cylinders being constructed with their head ends terminating in a common plane, the three cylinders being arranged adjacent with their axes substantially parallel, the axes of the said plane of the head end termination of the cylinders being of right angle with the axial plane of the said three cylinders, the said compression clearance chambers being constructed of diminishing volumetric displacement toward its sides in all directions from a center of an approximate location substantially coincident with a point intermediate the respective end and common central cylinder, an ignition device with each of the two compression clearance chambers, the ignition device of each compression clearance chamber being disposed therewith at a point in the wall of the respective chamber coincident with the center of the portion of the respective chamber having the greatest volumetric to wall area ratio.

5. In an internal combustion engine, three cylinders arranged adjacent and substantially axially parallel, pistons arranged for operation within all the cylinders, two compression clearance chambers provided with the three cylinders each of said clearance chambers respectively arranged providing a connection between the chamber of one of the two end cylinders and the chamber of the common central cylinders, the two compression clearance chambers being respectively formed of diminishing volume toward its sides in all direction from a central point and each of the two compression clearance chambers being formed terminating at a common central point relatively coincident with the axis of the central cylinder of the three cylinders and in a plane relatively of close proximity to the plane of the piston head of the said central cylinder when the respective piston is in a position of head end center.

6. In an internal combustion engine, the combination, three cylinders, two compression clearance chambers, the three cylinders being arranged adjacent, one cylinder provided with exhaust ports and the other two cylinders provided with inlet ports, one compression clearance chamber provided with each cylinder having inlet ports, the two compression clearance chambers being arranged commonly connecting with the chamber of the one cylinder having exhaust ports, each of the two compression clearance chambers being adapted to provide a passage communication and a compression clearance space respectively to and between the chamber of one of the two cylinders having inlet ports in common with the chamber of the one cylinder having the exhaust ports.

In testimony whereof I affix my signature.

EVERETT R. BURTNETT.